INVENTOR
Hector Bazin
Julia Koran

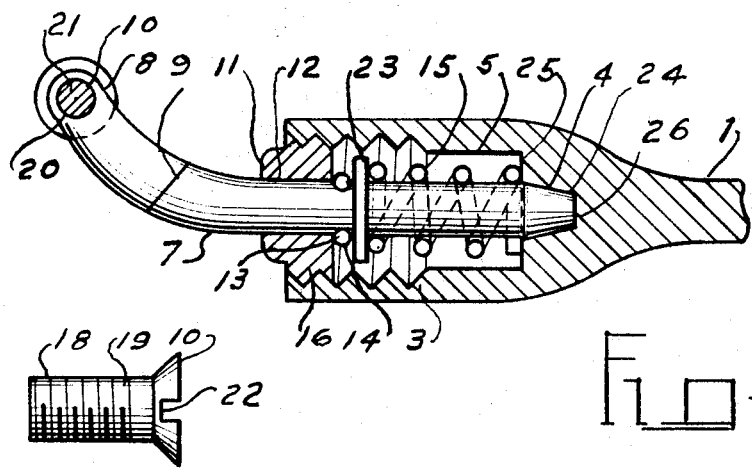
FIG-7
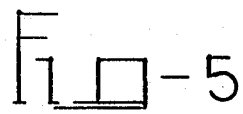
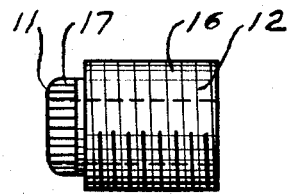
FIG-5
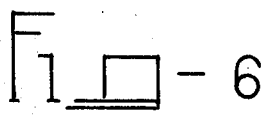
FIG-6
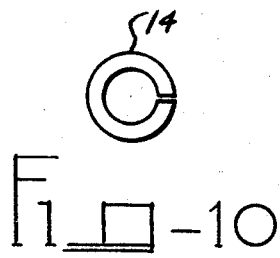
FIG-10
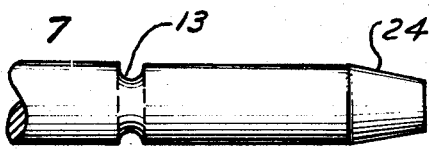
FIG-9
FIG-8
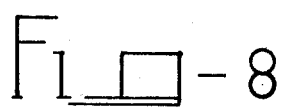
INVENTOR
Hector Bazin
Julia Koran 3,392,445
COMBINATION SWIVELING AND STATIONARY
GLASS CUTTING TOOL
Julia Koran and Hector Bazin, both of 7925
Escanaba Ave., Chicago, Ill. 60617
Filed Oct. 24, 1965, Ser. No. 504,394
1 Claim. (Cl. 30—164.95)

ABSTRACT OF THE DISCLOSURE

A glass cutting tool having an alternately swiveling and stationary cutting wheel support member. The cutting wheel support member is bifurcated at one end to receive a cutting wheel and is received in a blind bore formed in the handle at its other end. A threaded plug cooperates with threads formed in the bore to alternately swivelly or stationarily secure the cutting wheel support member in the bore.

---

This invention relates to a glass cutting tool to make glass cutting by hand easier and faster, especially for free hand cutting of body and wind-shield glass and cutting with patterns.

Present hand glass cutting tools are very slow and do not swivel on radius cutting, thus scratching the glass.

It is accordingly the object of this invention to provide a manual glass cutting tool that will cut glass on a radius or contour of pattern smoothly, fast and accurately without scratching and eliminates breakage in laminated glass cutting.

It is accordingly the object of this invention to provide a manual glass cutting tool with which any cutting line, radius or contour or glass pattern can be very easily followed due to the swiveling action of the cutter at the end of a gooseneck radius arm.

Figure 1:
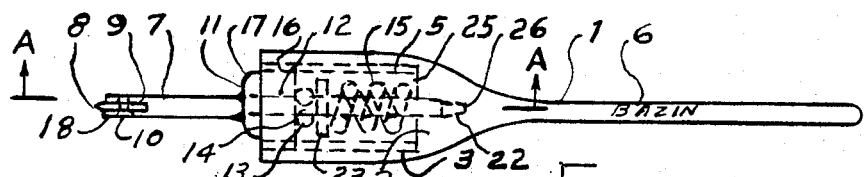
Figure 2:
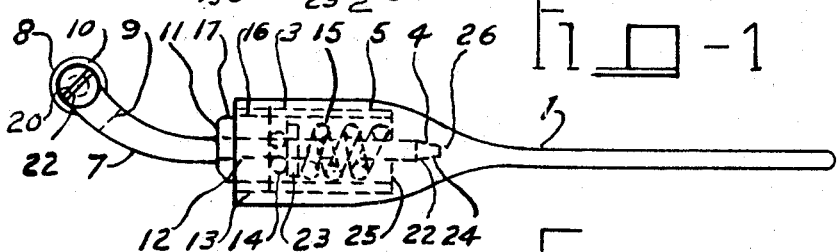
Figure 3:
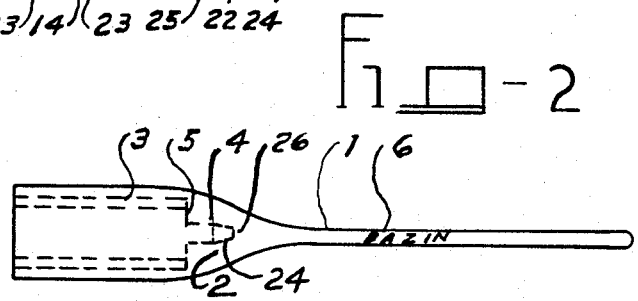
Figure 11:
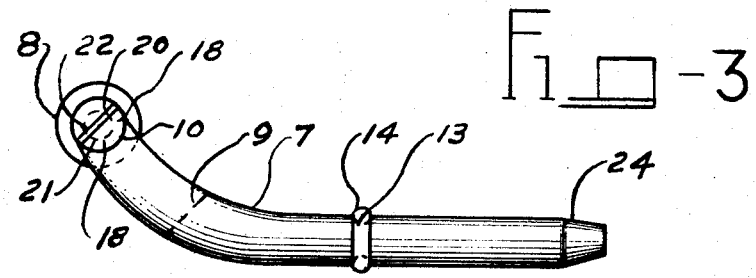
Figure 4:
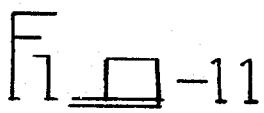
Figure 4:
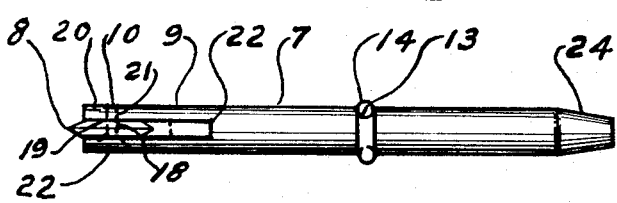

Other and further objects of this invention will be apparent from the following description and drawings:

FIGURE 1 is a plan view of the assembled device; FIGURE 2 is a side view of FIG. 1; FIGURE 3 is a plan view of the handle; FIGURE 4 is an enlarged view of the gooseneck-like cutting wheel support member; FIGURE 5 is an enlarged partial sectional view taken on line A—A of FIG. 1; FIGURE 6 is an enlarged side view of the screw threaded plug; FIGURE 7 is an enlarged view of the precision screw; FIG. 8 is an enlarged view of the compression spring; FIG. 9 is an enlarged side view of one end of the gooseneck-like cutting wheel support member; FIG. 10 is an enlarged view of the snap ring; FIG. 11 is an enlarged side view of the gooseneck-like cutting wheel support member.

Referring now in detail to the drawing, our improved tool comprises an elongated gooseneck-like cutting wheel support member 7 having a glass cutting wheel 8 mounted at one end and an elongated shank at the other end.

Coacting with the cutting wheel support member and in axial alignment with the shank portion thereof, is a handle member 1 provided at one end with an enlarged portion having an inwardly extending blind bore 5. A conical bore 4 formed in the bottom wall 25 of blind bore 5 receives and supports the tapered end 24 of the shank. The gooseneck-like cutting wheel support member 7 is further held and rotatably supported in the blind bore of the handle by a male plug 11 having a through bore 12 for receiving the shank of the cutting wheel support member and external threads 16 for engagement with the internal threads 3 formed on the outer end of the blind bore. Releasably seated in an annular groove 13 formed in the shank of the cutting wheel support member is a snap ring 14 which cooperates with the male plug 11 to limit the axial movement of the shank, see FIG. 5.

The distance between the split ring and the end of the shaft is slightly less than the distance between the bottom wall 26 of the conical bore 4 and the internal wall of male plug 11 so that the cutting wheel support member is capable of limited longitudinal movement. A compression spring 15 encircling the portion of the shank received in the blind bore has one end seated against the bottom wall 25 of the blind bore and the other end seated against a washer 23 disposed on the shank between the split ring and the spring whereby the compression spring urges the split ring against the internal wall of the plug.

The glass cutting wheel 8 is rotatably secured between a pair of arms defined by a slot 9 in the free end of the gooseneck-like support member 7. A flat head precision screw 10 extends through a hole 20 drilled in one of the arms, the bore formed in the cutting wheel, and a tapped hole 21 formed in the other arm. The cutting wheel is offset with respect to the longitudinal axis of the handle by means of an arcuate portion on the support member disposed intermediate the ends thereof.

In operation the cutter wheel may be alternately held in two positions, one in which the support member is rotatably held in the handle and a second position in which the support member is held against rotation with respect to the handle. Rotation of support member in the first position is accomplished with the compression spring biasing the washer and the split ring against the internal surface of the male plug 11 and the male plug positioned so as to leave a space between the bottom wall 26 of the conical bore. This arrangement allows the support member to be normally held stationary while being free to rotate when the spring force is overcome. To non-rotatably secure the support member, the male plug is screwed in so as to completely seat the tapered end 24 of the shank in the conical bore 4 and hold the same against rotation. Thus it may be seen from the above, that the cutter may be used to score a piece of glass on an arc with the support member positioned to rotate and follow the pattern of the cut. On the other hand the support member may be secured against rotation when such movement is undesirable.

What we claim is:
1. A glass cutting tool comprising a handle having an axially extending bore in one end thereof, said bore having an outer threaded portion and an inner counterbored portion, an externally threaded plug received in the threaded portion of said bore and having a central aperture extending therethrough, a gooseneck-type shank having a straight portion and a contiguous curved bifurcated portion, said straight portion being slidably and rotatably positioned in said plug and rotatably received by said counterbore, said curved neck portion having a glass cutting wheel mounted in said bifurcated end, said straight portion of said shank having a circumferential groove and a split ring mounted in said groove inwardly of said plug, a washer positioned against said ring and a compression spring encircling said straight shank portion and having one end in engagement with said washer and the other end in engagement with the inner end of said bore whereby the gooseneck shank is normally held in a stationary position while being free to swivel when the spring bias is overcome.

References Cited

UNITED STATES PATENTS

| 1,511,016 | 10/1924 | Barker. |
| 2,629,182 | 2/1953 | Nix _____ 30—292 X |
| 3,160,043 | 12/1964 | Judd _____ 30—164.95 X |

ROBERT C. RIORDON, *Primary Examiner.*

WILLIAM FELDMAN, OTHELL M. SIMPSON,
*Examiners.*

R. V. PARKER, JR., *Assistant Examiner.*